United States Patent
Clymer et al.

(10) Patent No.: US 7,574,502 B2
(45) Date of Patent: Aug. 11, 2009

(54) EARLY WARNING OF POTENTIAL SERVICE LEVEL AGREEMENT VIOLATIONS

(75) Inventors: Shawn Allen Clymer, Raleigh, NC (US); Douglas Kevin Willenborg, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 10/612,190

(22) Filed: Jul. 2, 2003

(65) Prior Publication Data

US 2005/0005271 A1    Jan. 6, 2005

(51) Int. Cl.
*G06F 15/173* (2006.01)
*G06F 12/00* (2006.01)

(52) U.S. Cl. .................................. 709/224; 709/229

(58) Field of Classification Search ......... 709/223–229, 709/238, 250
See application file for complete search history.

(56) References Cited

U.S. PATENT DOCUMENTS

| 6,611,867 B1 * | 8/2003 | Bowman-Amuah ......... 709/224 |
| 2003/0120771 A1 * | 6/2003 | Laye et al. .................. 709/224 |
| 2003/0187967 A1 * | 10/2003 | Walsh et al. ................. 709/223 |

FOREIGN PATENT DOCUMENTS

EP    1 229 685 A2    8/2002

OTHER PUBLICATIONS

U.S. Appl. No. 09/547,273, filed Apr. 11, 2000.

\* cited by examiner

*Primary Examiner*—Zarni Maung
(74) *Attorney, Agent, or Firm*—Stevens & Showalter LLP (57) ABSTRACT

Monitoring compliance with a service level agreement is provided by generating an early warning notification indicating that failure to meet a service level objective of the service level agreement by a resource is about to occur. The early warning notification may include an indication of how close the resource is to failing to meet the service level objective.

19 Claims, 5 Drawing Sheets

EARLY WARNING OF POTENTIAL SERVICE LEVEL AGREEMENT VIOLATIONS

FIELD OF THE INVENTION

The present invention relates to networks and more particularly to monitoring of service level agreement compliance.

BACKGROUND OF THE INVENTION

Computer networks have grown increasingly complex with the use of distributed client/server applications, mixed platforms and multiple protocols all on a single physical backbone. The control of traffic on networks is likewise moving from centralized information systems departments to distributed work groups. The growing utilization of computer networks is not only causing a move to new, high speed technologies, but is, at the same time, making the operation of computer networks more critical to day to day business operations. Furthermore, as computer systems become more distributed, the operation of related systems may be controlled by different entities. For example, web hosting or web applications may be provided for companies by a web hosting or web application service company.

Service level agreements (SLAs) are becoming increasingly common in networks, such as networks supporting Internet protocol (IP) communications. SLAs may include one or more service level objectives (SLOs) which specify measurable criteria against which the performance of a resource is compared to determine if the criteria is met. A resource may be any component in an information technology infrastructure, the performance of which may be measured against a criteria. For example, a server, a router, an application on a server, a network connection and the like all may be resources.

As an example, a service level agreement (SLA) with a customer of a web hosting company may include one or more service level objectives (SLOs) that specify availability and/or performance criteria that are to be met by the web hosting company. For example, an SLO may specify that a resource, such as a particular website or application, is available for 99.9% of each month. SLOs of the SLA could also specify a minimum throughput, number of transactions supported or response time of the resource or a different resource. The resource's availability is monitored and, if the resource is not available 99.9% of a month, a violation of the SLO has occurred. Similarly, if the required throughput, number of transactions or response time is not met for the resource, a violation of the corresponding SLO of the SLA could also be noted.

One difficulty presented in monitoring compliance with SLAs is that a common resource may be related to multiple SLAs from one or more customers. As the number of SLAs increases, the complexity of monitoring and/or assuring SLA compliance may also increase. For example, if a series of servers hosting multiple applications for different customers go down, the unavailability of the servers may be monitored against different SLOs of the respective SLAs of the customers. The availability criteria may be different for the different customers. However, each SLO violation may generate a notification that the violation has occurred, each of which may be viewed as the same priority to a network or system administrator receiving the notifications. Furthermore, the notifications are typically generated after failure to meet the SLO. Thus, there may be no ability to resolve the problem in a manner that would avoid non-compliance with the SLA.

SUMMARY OF THE INVENTION

Embodiments of the present invention provide for monitoring compliance with a service level agreement (SLA) by generating an early warning notification indicating that failure to meet a service level objective (SLO) of the SLA by a resource is about to occur. The early warning notification may include an indication of how close the resource is to failing to meet the SLO.

In particular embodiments of the present invention, the service level objective is an availability service level objective. In such embodiments, generating an early warning notification indicating that failure to meet a service level objective of the service level agreement by a resource is about to occur may include determining if the resource is within a predefined threshold value of failing an availability requirement of the service level objective and generating an early warning notification if the resource is within the predefined threshold value of failing the availability requirement of the service level objective.

In still further embodiments of the present invention, an amount of unavailability before the resource fails to comply with the availability requirement of the service level objective is determined. An early warning notification is generated that includes the determined amount of unavailability.

In yet other embodiments of the present invention, a plurality of service level objectives are associated with the resource. In such embodiments, a service level objective of the plurality of service level objectives which the resource is closest to failing to comply with an availability requirement is determined so as to identify a critical service level objective. Generating an early warning notification if the resource is within the predefined threshold value of failing the availability requirement of the service level objective is provided by generating an early warning notification for the critical service level objective. The early warning notification may be generated for the critical service level objective and not generated for other service level objectives in the plurality of service level objectives. Additionally, it may be determined if the resource fails to comply with the availability requirement of the critical service level objective. A next service level objective of the plurality of service level objectives which the resource is closest to failing to comply with an availability requirement may be determined so as to identify a subsequent critical service level objective. An early warning notification for the subsequent critical service level objective is generated. An amount of unavailability before the resource fails to comply with the availability requirement of the subsequent critical service level objective may also be determined and a notification generated that includes the determined amount of unavailability.

In still further embodiments of the present invention, generating an early warning notification comprises sending a message to a console, generating an e-mail message, setting a simple network management protocol trap and/or updating a database and generating a report from the updated database.

In additional embodiments of the present invention, monitoring compliance with an availability service level agreement is provided by determining a maximum down time (MADT) for a resource to comply with the service level agreement, determining an early warning threshold (ewdt) based on the maximum down time, monitoring accumulated down time (A) for the resource since a beginning of a compliance period associated with the service level agreement, determining if the accumulated down time for the resource exceeds the early warning threshold and generating an early warning notification if the accumulated down time of the resource exceeds the early warning threshold. A notification may also be generated that includes a remaining time before the accumulated down time of the resource exceeds the maximum down time.

In other embodiments of the present invention, monitoring accumulated down time is provided by receiving notification that the resource is down, incrementing the accumulated down time responsive to receiving notification that the resource is down, receiving notification that the resource is up and terminating incrementing the accumulated down time responsive to receiving notification that the resource is up. Monitoring accumulated down time could also be provided by periodically polling a resource to determine the accumulated down time of the resource and/or polling a resource information data source to determine the accumulated down time of the resource.

In yet further embodiments of the present invention, determining a maximum down time (MADT) for a resource to comply with the service level agreement and determining an early warning threshold (ewdt) based on the maximum down time are repeated for a plurality of service level agreements. In such embodiments, determining if the accumulated down time for the resource exceeds the early warning threshold may be provided by determining if the accumulated down time for the resource exceeds a minimum early warning threshold of the early warning thresholds for the plurality of service level agreements. Generating an early warning notification if the accumulated down time of the resource exceeds the early warning threshold may be provided by generating an early warning notification if the accumulated down time of the resource exceeds the minimum early warning threshold.

As will further be appreciated by those of skill in the art, while described above primarily with reference to method aspects, the present invention may be embodied as methods, apparatus/systems and/or computer program products.

DETAILED DESCRIPTION OF THE INVENTION

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
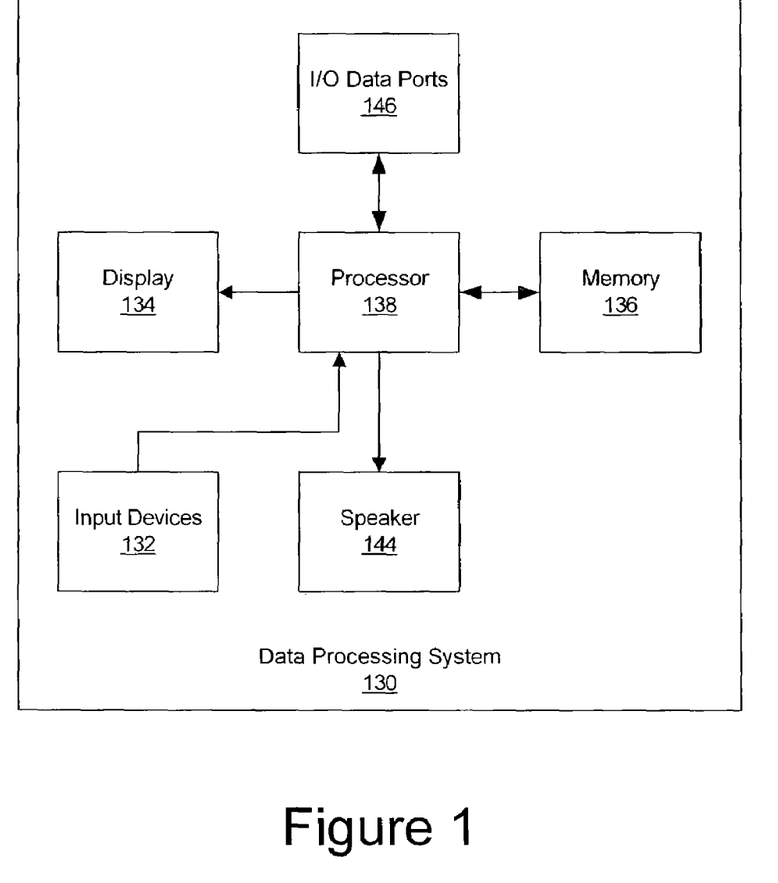
FIG. 1 is a block diagram of a data processing system suitable for use in an SLA early warning system according to embodiments of the present invention.

Various embodiments of the present invention will now be described with reference to the figures. FIG. 1 illustrates an exemplary embodiment of a data processing system 130 suitable for SLA early warning in accordance with embodiments of the present invention. The data processing system 130 typically includes input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
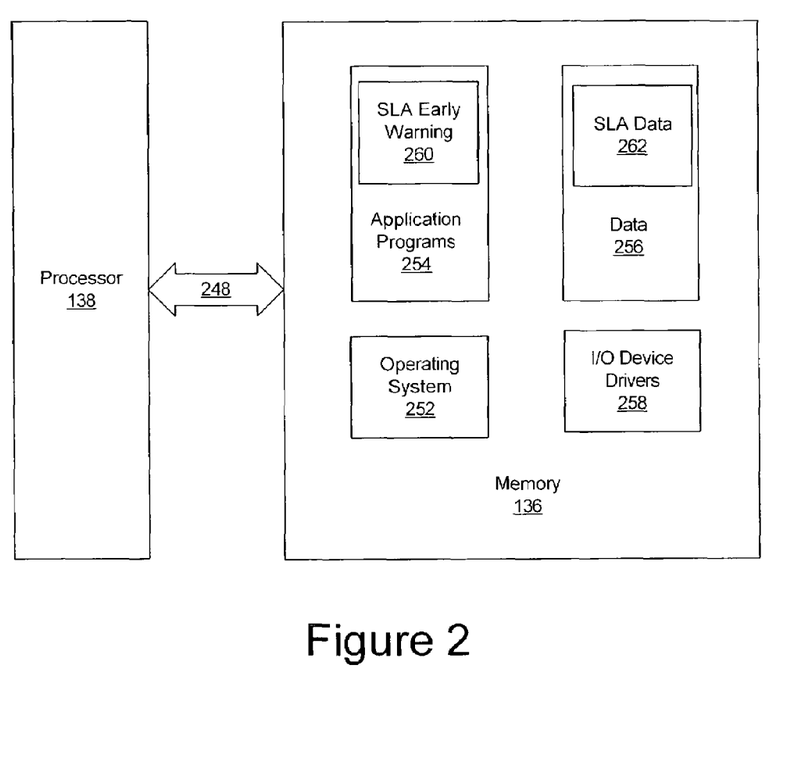
FIG. 2 is a more detailed block diagram of an SLA early warning system according to embodiments of the present invention.

FIG. 2 is a block diagram of data processing systems that illustrate systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System 390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254, to communicate with devices such as the I/O data port(s) 146 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 may include an SLA early warning module 260. The SLA early warning module 260 may carry out the operations described herein for providing advanced warning of when an SLO of an SLA is about to be breached. The data portion 256 of memory 136, as shown in the embodiments of FIG. 2, may, optionally, include SLA data 262. The SLA data 262 may be utilized by the SLA early warning module 260 to provide compliance information and/or provide data for determining when an early warning of potential failure to meet SLO of an SLA occurs and/or provide an indication of when such a failure may occur.

While the present invention is illustrated, for example, with reference to the SLA early warning module 260 being an application program in FIG. 2, as will be appreciated by those of skill in the art, other configurations may also be utilized while still benefitting from the teachings of the present invention. For example, the SLA early warning module 260 may also be incorporated into the operating system 252, the I/O device drivers 258 or other such logical division of the data processing system 130. Thus, the present invention should not be construed as limited to the configuration of FIG. 2 but is intended to encompass any configuration capable of carrying out the operations described herein.

Figure 3:
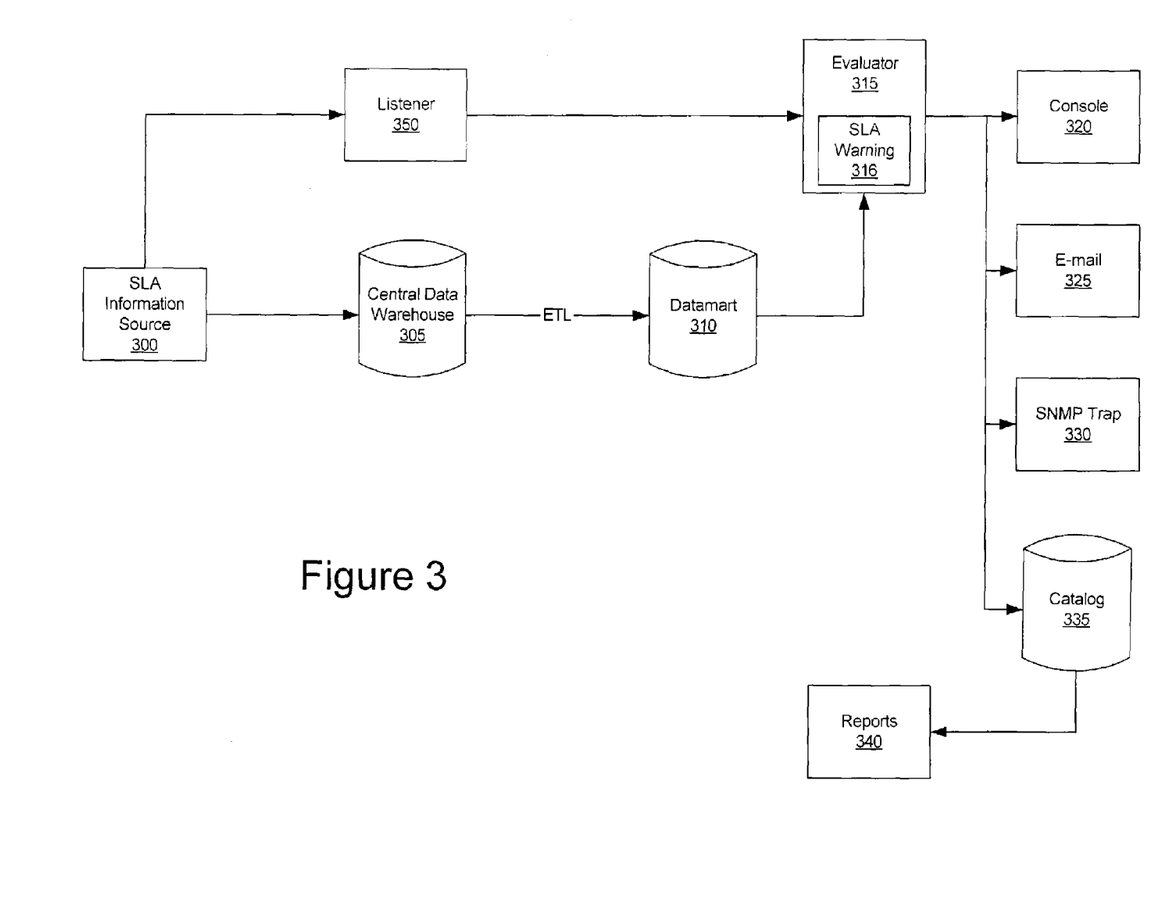
FIG. 3 is a block diagram of a system incorporating an SLA early warning system according to embodiments of the present invention.

FIG. 3 is a block diagram of a system incorporating SLA early warning according to embodiments of the present invention. As seen in FIG. 3, an SLA information source 300 provides SLA information, such as availability information, throughput information, transaction time information or the like, to a central data warehouse 305. In particular embodiments of the present invention, the SLA information source 300 may be a network monitoring application, such as Tivoli Netview from International Business Machines Corporation, Armonk, N.Y., a trouble ticket management system, a problem and change management system and/or a monitored resource itself. The central data warehouse 305 may, for example, be provided by Tivoli Data Warehouse from International Business Machines Corporation, Armonk, N.Y.

The SLA information contained in the central data warehouse 305 may be extracted, transformed and loaded (ETL) into a datamart 310, such as provided by the IBM Tivoli Service Level Advisor. An evaluator 315 may periodically poll the datamart 310 to extract service level information and evaluate the extracted service level information to determine if an early warning notification for an SLO of an SLA is appropriate. An early warning notification will be provided prior to failure to meet the SLO. The early warning notification may be provided when a predefined threshold of non-compliance with the SLO has been reached, where the predefined threshold is less than the threshold for failure to meet the SLO. The evaluator 315 may also determine when the SLO of the SLA will be breached and provide that information with the early warning notification.

In event driven embodiments of the present invention, a listener 350 may monitor the SLA information source 300 and generate an SLA event based on the SLA information for a resource. The evaluator 315 includes an SLA warning module 316 that receives the SLA event and evaluates the resources status to determine if an early warning notification for an SLO of an SLA is appropriate. An early warning notification will be provided prior to failure to meet the SLO. The early warning notification may be provided when a predefined threshold of non-compliance with the SLO has been reached, where the predefined threshold is less than the threshold for failure to meet the SLO. The evaluator 315 may also determine when the SLO of the SLA will be breached and provide that information with the early warning notification.

While the listener 350 is illustrated as a separate component in FIG. 3, the listener may be incorporated with the evaluator 315 or may provided as part of the SLA information source 300. Thus, embodiments of the present invention should not be construed as limited to the particular division of function as illustrated in FIG. 3.

In either polling or event driven embodiments of the present invention, the evaluator 315 may provide notification of the early warning through, for example, sending a message to a console 320 to alert, for example, an operator, sending a notification to an e-mail service 325 so as to generate an e-mail notification, setting a Simple Network Management Protocol (SNMP) trap 330 and/or logging the notification in a catalog database 335 that may then generate a notification through, for example, a reporting system 340. As discussed above, the notification may include an indication of how close a resource is to non-compliance with an SLO of an SLA. The notification may also include, for example, an indication of the SLA and/or SLO associated with the notification and an indication of the resource associated with the notification and/or an indication of a customer associated with the SLA.

By providing an indication of how close a resource is to non-compliance, corrective action to bring the resource into compliance may be prioritized, for example, so as to reduce and/or minimize the number of SLA and/or SLO compliance failures resulting from the resource.

In particular embodiments of the present invention, the SLO is an availability SLO and the early warning notification is generated when a predefined percentage of the total down time acceptable under the SLO is exceeded. Furthermore, the notification may provide a time until non-compliance with the availability is reached. Additionally, the early warning notification may be selectively generated for a resource such that an early warning notification is only generated for the SLO associated with the resource with the shortest time until non-compliance. Thus, for example, if a resource has multiple SLOs and/or SLAs associated with the resource, the number of early warning notifications may be reduced to the most critical. A subsequent early warning notification may be sent for a next most critical SLO as failure to meet the compliance requirements of the currently most critical SLO is reached. This process may continue until no more SLO's remain above their respective early warning notification thresholds or until the resource becomes available.

While embodiments of the present invention are described herein with reference to the network monitoring system illustrated in FIG. 3, the present invention should not be construed as limited to such systems. Thus, for example, embodiments of the present invention may be provided in a stand-alone application, as part of an SLA monitoring system or as part of a network monitoring system as illustrated in FIG. 3. Accordingly, the present invention should not be construed as limited to a particular system configuration but may be utilized in any system capable of carrying out the operations described herein for SLA compliance determinations.

Figure 4:
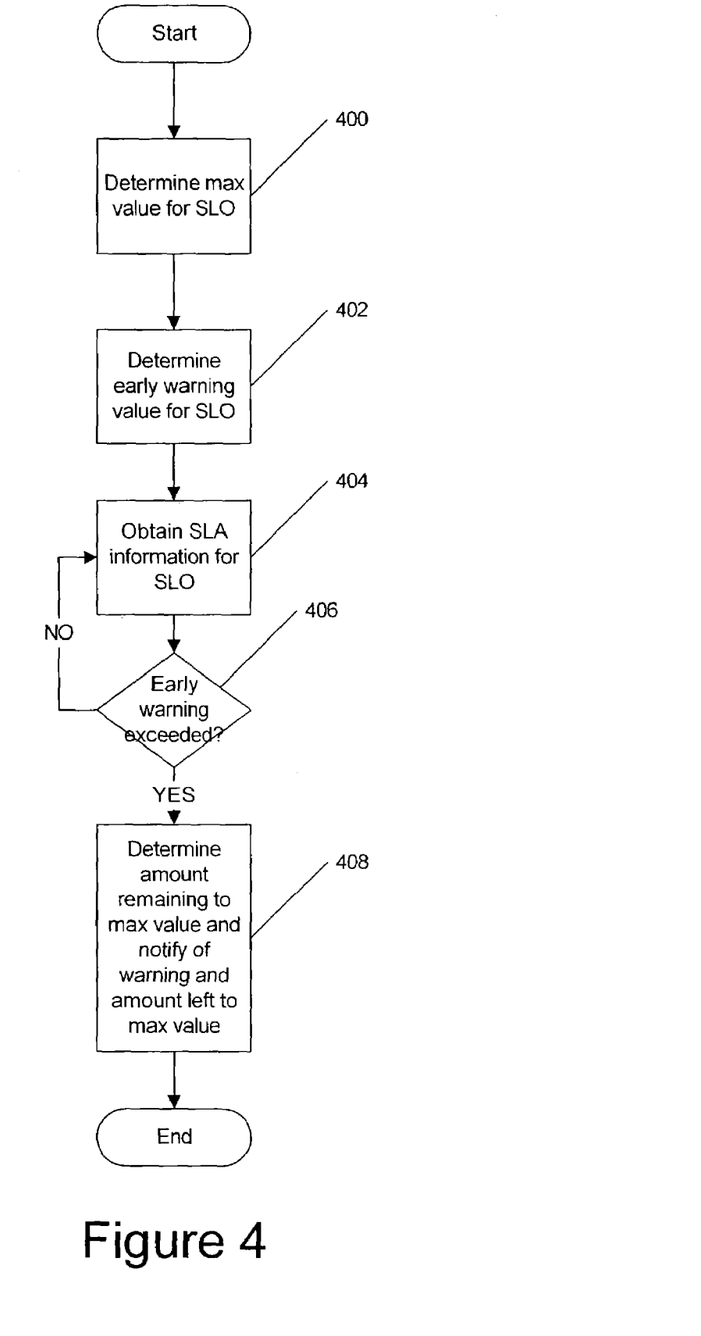
FIG. 4 is a flowchart illustrating operations for SLA early warning according to embodiments of the present invention.

Operations according to embodiments of the present invention will now be described with reference to the flowcharts of FIGS. 4 and 5. As seen in FIG. 4, a maximum value for an SLO of an SLA is determined (block 400). For example, for an availability SLO, the maximum value may be the maximum down time for a resource for the time period defined in the SLO. Thus, a maximum allowable down time (MADT) may be defined as $(1-V) \times T$ where V is the percentage value of the time period T at which a breach of the SLO occurs.

An early warning threshold value is also determined based on the maximum value (block 402). For example, the early warning threshold value may be provided as a percentage of the maximum value for the SLO. In the present availability example, the early warning down time value (ewdt) may be a percentage, such as 70%, of the MADT, which is 0.7MADT. The resource is monitored by obtaining SLA information for the resource that relates to the SLO (block 404). As described above, the SLA information may, for example, be obtained by polling a resource, a database of resource information or other such SLA information source or may be event driven by receiving an SLA event, such as a notification of a resource being down or coming up. In either case, the value of the SLA information is evaluated to determine if the early warning threshold value has been exceeded for the resource (block 406). If not, monitoring the resource SLA information continues (block 404).

If, however, the early warning threshold value is exceeded (block 406), the amount remaining before the maximum value is reached for the SLO is determined and a notification generated indicating that the early warning threshold has been exceeded and, optionally, includes the amount remaining information (block 408). For example, in the availability example, the amount of time before the MADT is exceeded may be determined by subtracting an accumulated down time (A) from MADT and this value provided as the amount of down time left before the SLO is breached.

Figure 5:
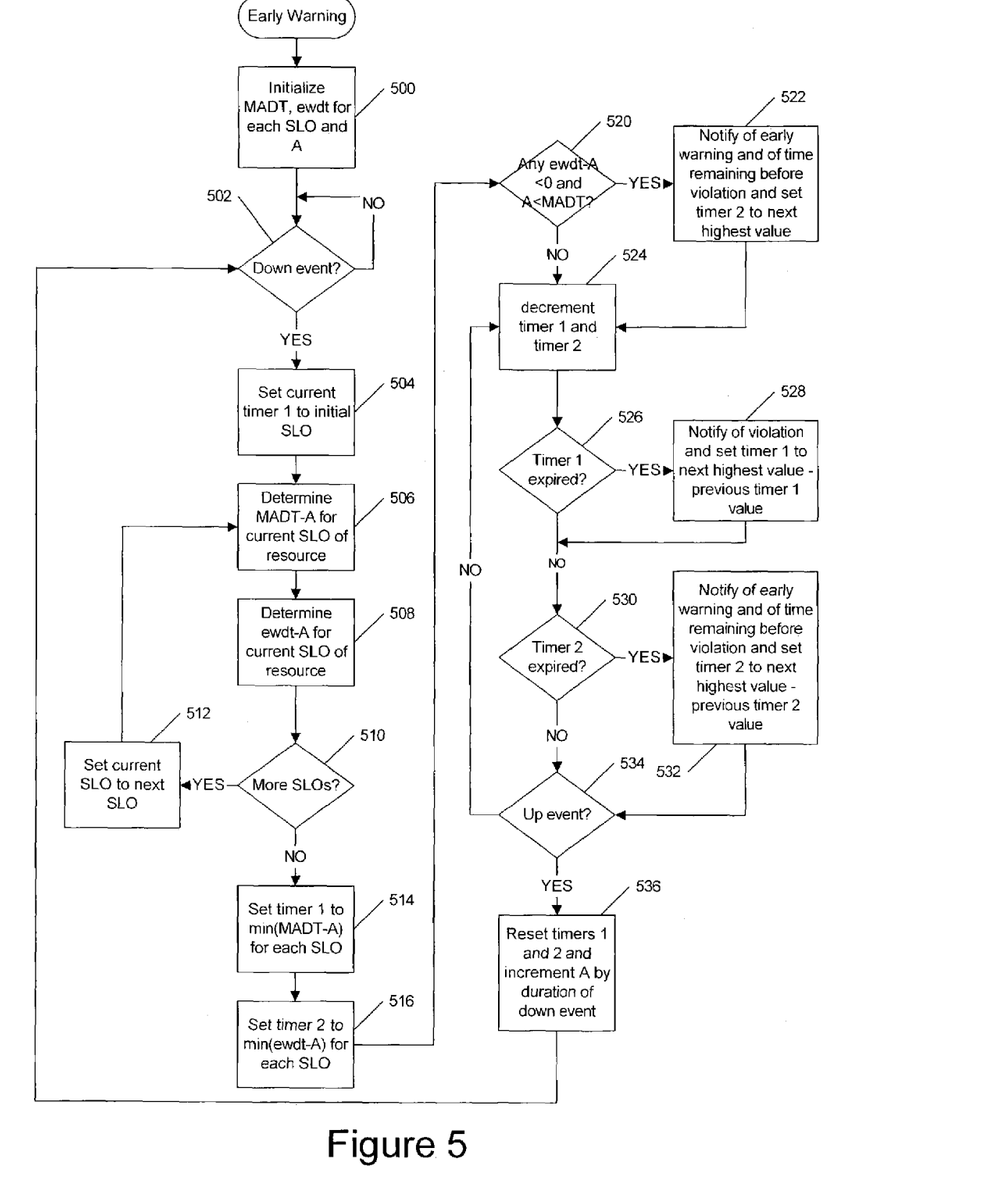
FIG. 5 is a flowchart illustrating operations for SLA early warning according to further embodiments of the present invention.

FIG. 5 illustrates further embodiments of the present invention where multiple SLOs are monitored for a resource utilizing an event driven system. In FIG. 5, a first timer, timer 1, is used to track SLO violations and a second timer, timer 2 is used to track early warnings. As illustrated in FIG. 5, the variables MADT and ewdt are initialized to their respective values of a maximum allowable down time and an early warning down time for each SLO that is monitored for a resource and an accumulated downtime variable A is also initialized, for example, at the start of a service agreement period (block 500). When an event is received that indicates that the resource is down (i.e. unavailable) (block 502), the current SLO is set to an initial SLO of the multiple SLOs for the resource (block 504). The difference between the maximum allowable down time (MADT) for the SLO and the accumulated down time for the resource (A), i.e., MADT-A, is determined for the current SLO (block 506). The difference between the early warning down time value (ewdt) for the SLO and A, i.e., ewdt-A, is also determined for the current SLO (block 508). If more SLOs are present (block 510), the current SLO is set to a next SLO (block 512) and operations continue from block 506.

When there are no more SLOs (block 510), MADT-A and ewdt-A have been determined for each of the SLOs and a first timer (timer 1) is set to the minimum of the values for MADT-A that is not negative for the SLOs (block 514). If a negative value is determined, a notification that the SLO is violated may be immediately generated. A second timer (timer 2) is set to the minimum of the values for ewdt-A that is not negative for the SLOs (block 516). If ewdt-A is less than zero and A is less than MADT for the SLO (block 520), then an early warning notification is generated for the SLO that includes MADT-A as the time remaining before a violation of the SLO occurs (block 522). Also, the value of timer 2 is set to the next highest ewdt-A value as the early warning of the minimum value has been exceeded (block 522).

In either case, timer 1 and timer 2 are decremented (block 524) and a determination of whether timer 1 has expired is made (block 526). If timer 1 has expired (block 526), a violation of the SLO for the current minimum MADT has occurred and a notification of the violation is generated (block 528). The value of timer 1 is also set to the next highest value of MADT-A (block 528). If timer 1 has not expired (block 526) operations continue from block 530.

As is further illustrated in FIG. 5, a determination of whether timer 2 has expired is also made (block 530). If timer 2 has not expired (block 530), a determination of whether an event has been received that indicates that the resource is available (i.e. an up event) (block 534). If not, operations continue from block 524. If an up event has been received (block 534), the timers 1 and 2 are reset and A is incremented by the duration of the down event (block 536). Operations then continue from block 502.

Returning to block 530, if timer 2 has expired (block 530), an early warning event has occurred for the minimum ewdt and an early warning notification is generated (block 528). The early warning notification may include the time remaining before violation of the SLO occurs. Such a determination may be made by determining MADT-A for the SLO for which the early warning notification is generated. The value of timer 2 is also set to the next highest value of ewdt-A (block 528). Operations then continue from block 534.

Thus, the operations of FIG. 5 provide for monitoring multiple SLOs with respect to the availability of a resource.

While FIG. 5 illustrates an event driven system, the operations of FIG. 5 could also be utilized in a polling system. In such a system, the resource or a database of resource information could be polled to determine if a resource was available or unavailable. Such operations could replace the waiting for event operations of blocks 502 and 534. Alternatively, if availability statistics were available for the resource, the determination of whether an early warning notification should be generated and the amount of time before violation of an SLO could be directly determined from the availability statistics.

As an example of an embodiment of the present invention, for SLAs with a period (T) of 31 days (44640 minutes) an SLO for a first customer (Customer A) may specify 99.9% availability. An SLO for a second customer (Customer B) may specify 90% availability. Also, an early warning threshold of 60% of the maximum allowable down time is set by a service provider. In such as case, the following is established for Customer A and Customer B:

Customer A
breach=0.999;
MADT=(1−0.999)(44640)=44.64 minutes;
ewdt=(44.64)(0.6)=26.78 minutes;
Customer B
breach=0.9;
MADT=(1−0.9)(44640)=4464 minutes or 3.1 days; and
ewdt=(4464)(0.6)=2678 minutes or 1.86 days.

If the resource goes down, a down event occurs. The MADT and ewdt values are determined for Customer A and Customer B. Because the down event is the first occurrence in the monitored time period, A is initially zero. Thus, the minimum values for MADT and ewdt are for Customer A. Thus, timer 1 will initially be set to 44.64 minutes and timer 2 set to 26.78 minutes. If the resource is unavailable for 30 minutes, after 26.78 minutes, timer 2 will expire and an early warning notification will be generated that indicates that MADT-A or 17.86 minutes remains before breach of the SLO for Customer A. Also, timer 2 will be set to the next lowest ewdt value reduced by the accumulated down time or 2678−26.78=2651.22 minutes for Customer B. After 30 minutes, the resource is again available and an up event is received. Timers 1 and 2 are reset and the accumulated down time A is set to 30 minutes.

When a subsequent down event occurs, MADT-A and ewdt-A are determined for each SLO. For Customer A, MADT-A is 14.64 minutes and for Customer B MADT-A is 4434 minutes. Thus, timer 1 is set to 14.64 minutes. For Customer A, ewdt-A is negative but MADT-A is positive so an early warning event is immediately generated indicating that 14.64 minutes remain before a violation will occur. Timer 2 is also set to ewdt-A for Customer B or 2648 minutes. After 14.64 minutes, timer 1 expires and a violation notification is generated. Also, timer 1 will be set to the next lowest MADT value reduced by the accumulated down time or 2678−30−14.64=2633.36 minutes for Customer B. If an up event is not received for 2648 minutes, timer 2 expires and an early warning notification is generated as described above. If an up event is received, the timers are reset and the accumulated down time A is updated.

The flowcharts and block diagrams of FIGS. 1 through 5 illustrate the architecture, functionality, and operation of possible implementations of systems, methods and computer program products for early warning of potential SLA non-compliance according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of monitoring compliance with a service level agreement, comprising:

associating a plurality of service level objectives with a resource in a corresponding information technology infrastructure, each service level objective associated with a corresponding service level agreement;

determining a first value for each service level objective, wherein:
the service level objective specifies at least one measurable criterion against which the performance of the resource is compared to determine if each criterion is met, and
the first value corresponds to a value associated with a threshold for failure to meet the associated service level objective;

determining a second value for each service level objective, wherein:
the second value corresponds to an early warning threshold value and is determined so as to be detected before the associated first value for that service level objective;

monitoring the resource by electronically obtaining service level agreement information for the resource that relates to each service level objective;

evaluating the obtained service level agreement information to determine if the early warning threshold value associated with any one of the service level objectives has been breached for the resource;

automatically determining a critical service level objective from the plurality of service level objectives as being the service level objective that the resource is closest to failing to comply with and determining for that critical service level objective, a measure of how close the resource is to non-compliance based upon the associated threshold for failure to meet the associated service level objective value of the critical service level objective, if at least one of the early warning threshold values has been breached; and generating an early warning notification indicating that failure to meet a service level objective may occur if at least one of the early warning threshold values has been breached, wherein the early warning notification identifies at least the critical service level objective and conveys the measure of how close the resource is to non-compliance of the critical service level objective.

2. The method of claim 1, wherein at least one service level objective comprises an availability service level objective.

3. The method of claim 2, wherein:
evaluating the obtained service level agreement information comprises determining if the resource is within a predefined threshold value of failing an availability requirement of a selected service level objective of the plurality of service level objectives; and
generating an early warning notification if the resource is within the predefined threshold value of failing to comply with the availability requirement of the selected service level objective.

4. The method of claim 3, further comprising:
determining an amount of unavailability before the resource fails to comply with the availability requirement of the selected service level objective; and
wherein the early warning notification conveys the measure of how close the resource is to non-compliance of the critical service level objective comprises generating a notification that includes the determined amount of unavailability.

5. The method of claim 1, further comprising only generating the early warning notification for the critical service level objective.

6. The method of claim 1, further comprising:
determining if the resource fails to comply with the availability requirement of the critical service level objective;
determining a next service level objective of the plurality of service level objectives with which the resource is closest to failing to comply so as to identify a subsequent critical service level objective; and
generating an early warning notification for the subsequent critical service level objective.

7. The method of claim 1, further comprising:
determining an amount of unavailability before the resource fails to comply with the availability requirement of the critical service level objective; and
wherein generating an early warning notification further comprises generating a notification that includes the determined amount of unavailability.

8. The method of claim 1, wherein generating an early warning notification comprises sending a message to a console, generating an e-mail message, setting a simple network management protocol trap and/or updating a database and generating a report from the updated database.

9. The method according to claim 1, wherein:
determining a first value for a predetermined service level objective included in a service level agreement comprises:
determining a maximum down time (MADT) for a resource to comply with the service level agreement;
determining a second value for the predetermined service level objective comprises:
determining an early warning threshold (ewdt) based on the maximum down time;
monitoring the resource by electronically obtaining service level agreement information for the resource that relates to the associated service level objective comprises:
monitoring accumulated down time (A) for the resource since a beginning of a compliance period associated with the service level agreement;
evaluating the obtained service level agreement information comprises:
determining if the accumulated down time for the resource exceeds the early warning threshold; and
generating an early warning notification comprises:
generating an early warning notification if the accumulated down time of the resource exceeds the early warning threshold.

10. The method of claim 9, wherein generating an early warning notification if the accumulated down time of the resource exceeds the early warning threshold comprises generating a notification that includes a remaining time before the accumulated down time of the resource exceeds the maximum down time.

11. The method of claim 10, wherein monitoring accumulated down time comprises:
receiving notification that the resource is down; and
incrementing the accumulated down time while the resource is down.

12. The method of claim 10, wherein monitoring accumulated down time comprises periodically polling a resource to determine the accumulated down time of the resource.

13. The method of claim 10, wherein monitoring accumulated down time comprises polling a resource information data source to determine the accumulated down time of the resource.

14. The method of claim 9, wherein determining a maximum down time (MADT) for a resource to comply with the service level agreement and determining an early warning threshold (ewdt) based on the maximum down time are repeated for each of the plurality of service level agreements;
wherein determining if the accumulated down time for the resource exceeds the early warning threshold comprises determining if the accumulated down time for the resource exceeds a minimum early warning threshold of the early warning thresholds for the plurality of service level agreements; and
wherein generating an early warning notification if the accumulated down time of the resource exceeds the early warning threshold comprises generating an early warning notification if the accumulated down time of the resource exceeds the minimum early warning threshold.

15. A system to monitor compliance with a service level agreement, comprising:
a central data warehouse;
at least one service level agreement information source that provides service level agreement information to the central data warehouse;
a datamart that stores service level agreement information that has been loaded therein from the central data warehouse; and
an evaluator that extracts service level information from the datamart and evaluates the extracted service level information to determine if an early warning notification for a service level of objective of the service level agreement is appropriate, wherein the early warning notification is determined based upon:
an association of a plurality of service level objectives with a resource in a corresponding information technology infrastructure, each service level objective associated with a corresponding service level agreement;
a first value for each service level objective, where the service level objective specifies at least one measurable criterion against which the performance of an associated resource in a corresponding information technology infrastructure is compared to determine if each criterion is met, and the first value corresponds to a value associated with a threshold for failure to meet the associated service level objective;

a second value for each service level objective, wherein the second value corresponds to an early warning threshold value and is determined so as to be detected before the associated first value for that service level objective; and an evaluation of the obtained service level agreement information to determine if the second value has been breached for the resource; and an automated determination of a critical service level objective from the plurality of service level objectives as being the service level objective that the resource is closest to failing to comply with and determining for that critical service level objective, a measure of how close the resource is to non-compliance based upon the associated threshold for failure to meet the associated service level objective value of the critical service level objective, if at least one of the early warning threshold values has been breached;

wherein the early warning notification identifies at least the critical service level objective and conveys the measure of how close the resource is to non-compliance of the critical service level objective.

16. The system of claim 15, wherein the early warning notification includes an indication of how close the resource is to failing to meet the service level objective.

17. The system according to claim 15, further comprising a service level agreement early warning module configured to:
determine a maximum down time (MADT) for a resource to comply with the service level agreement;
determine an early warning threshold (ewdt) based on the maximum down time;
monitor accumulated down time (A) for the resource since a beginning of a compliance period associated with the service level agreement;
determine if the accumulated down time for the resource exceeds the early warning threshold; and
generate an early warning notification if the accumulated down time of the resource exceeds the early warning threshold.

18. A computer program product for monitoring compliance with a service level agreement, comprising:
a computer readable medium having computer readable program code embodied therein, the computer readable program code comprising:
computer usable program code configured to associate a plurality of service level objectives with a resource in a corresponding information technology infrastructure, each service level objective associated with a corresponding service level agreement;
computer usable program code configured to determine a first value for each service level objective included in a service level agreement, where the service level objective specifies at least one measurable criterion against which the performance of an associated resource in a corresponding information technology infrastructure is compared to determine if each criterion is met, and the first value corresponds to a value associated with a threshold for failure to meet the associated service level objective;
computer usable program code configured to determine a second value for each service level objective, wherein the second value corresponds to an early warning threshold value and is determined so as to be detected before the associated first value for that service level objective;
computer usable program code configured to monitor the resource by obtaining service level agreement information for the resource that relates to each associated service level objective;
computer usable program code configured to evaluate the obtained service level agreement information to determine if the early warning threshold value associated with any one of the service level objectives has been breached for the resource;
computer usable program code configured to automatically determine a critical service level objective from the plurality of service level objectives as being the service level objective that the resource is closest to failing to comply with and determining for that critical service level objective, a measure of how close the resource is to non-compliance based upon the associated threshold for failure to meet the associated service level objective value of the critical service level objective, if at least one of the early warning threshold values has been breached; and
computer usable program code configured to generate an early warning notification indicating that failure to meet a service level objective may occur if at least one of the early warning threshold values has been breached, wherein the early warning notification identifies at least the critical service level objective and conveys the measure of how close the resource is to non-compliance of the critical service level objective.

19. The computer program product according to claim 18, wherein:
computer usable program code configured to determine a first value for a predetermined service level objective comprises computer readable program code configured to determine a maximum down time (MADT) for a resource to comply with the service level agreement;
computer usable program code configured to determine a second value for the predetermined service level objective comprises computer readable program code configured to determine an early warning threshold (ewdt) based on the maximum down time;
computer usable program code configured to monitor the resource comprises computer readable program code configured to monitor accumulated down time (A) for the resource since a beginning of a compliance period associated with the service level agreement;
computer usable program code configured to monitor the resource by obtaining service level agreement information for the resource comprises computer readable program code configured to determine if the accumulated down time for the resource exceeds the early warning threshold; and
computer usable program code configured to generate an early warning notification indicating that failure to meet a service level objective of the service level agreement comprises computer readable program code configured to generate an early warning notification if the accumulated down time of the resource exceeds the early warning threshold.

* * * * *